(No Model.)

B. J. CURRY.
HAY PRESS.

No. 350,663. Patented Oct. 12, 1886.

Witnesses
W. A. Shoemaker
Fred E. Tasker

Inventor
Burwell J. Curry
Geo. E. Tasker atty.

N. PETERS, Photo-Lithographer, Washington, D. C.

UNITED STATES PATENT OFFICE.

BURWELL J. CURRY, OF HUNTSVILLE, ALABAMA.

HAY-PRESS.

SPECIFICATION forming part of Letters Patent No. 350,663, dated October 12, 1886.

Application filed January 30, 1886. Serial No. 190,280. (No model.)

*To all whom it may concern:*

Be it known that I, BURWELL J. CURRY, a citizen of the United States, residing at Huntsville, in the county of Madison and State of Alabama, have invented certain new and useful Improvements in Hay-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in hay or cotton presses; and it consists in an arrangement and combination of parts for compressing two bales of hay at a single operation, as will be hereinafter fully set forth.

Figure 1:
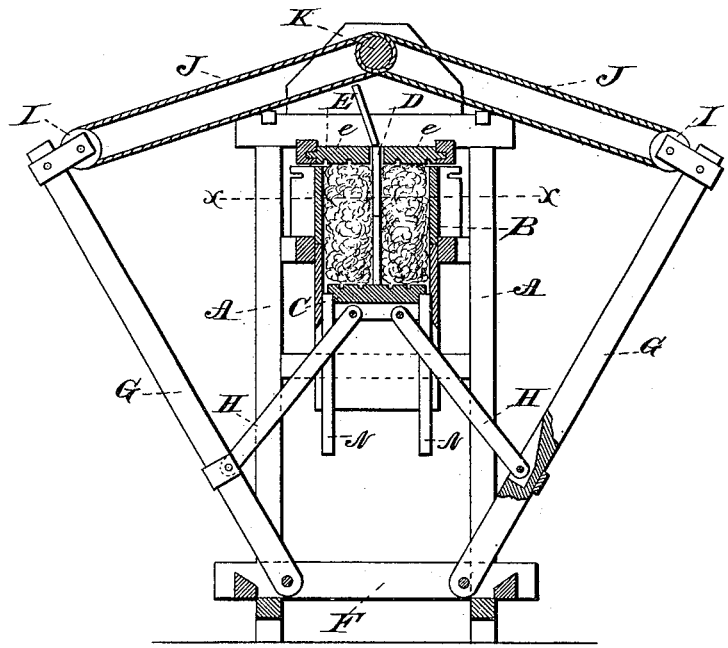
Figure 2:
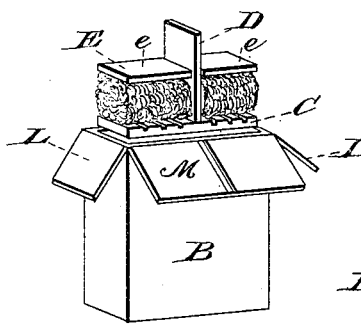
Figure 3:
Figure 4:
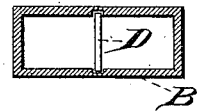

In the annexed drawings, Figure 1 is a vertical section of my improved press. Fig. 2 is a perspective view of the press-box with its doors open, and showing two bales of hay compressed and ready to be removed. Fig. 3 is a perspective of the sectional partition, and Fig. 4 is a cross-section through the press-box and partition on the line $x\,x$ of Fig. 1.

Like letters of reference designate like parts in the several views.

The frame of my improved press consists of uprights A A and cross pieces or beams for properly connecting them, the said frame serving to uphold the press box or chamber B, and also to support the leverage by means of which a vertically-reciprocating platen, C, within the press-box is actuated. The press-box B is situated between the uprights A A, (see Fig. 1,) being secured in place in any convenient and suitable manner. The upper portion of the press-box is closed by means of doors L on each end and doors M on the front and back, which, as shown in Fig. 2, are preferably hinged so as to open downward, and thus enable the hay or other material to be placed within the press at the beginning of the operation, and also to enable the completed bales to be disengaged at the end of the operation.

Above the chest or chamber B is a platen, E, secured in the frame in any desired manner, and serving to close the upper end of the chamber and afford a firm and unyielding bed or partition, against which the hay or cotton will be compressed by the upward movement of the traveling platen C. The upper platen, E, is constructed in two parts, $e\,e$, between which is a space or slot, through which a vertical partition, D, resting at its lower edge upon the platen C, emerges when the said platen begins to ascend. The lower platen, C, is arranged within the chamber B in such a manner as to reciprocate vertically, its upper surface being preferably grooved, as is also the lower surface of the platen E, for the reception of the bale-ties. This lower platen is provided at its lower corners with downwardly-projecting guide-pieces N N, and is connected, by means of levers or connecting-rods H H, attached to its lower face, with the main levers G G, which are pivoted in the lower portion of the frame. It will be seen that as the main levers are raised to a vertical position the connecting-rods H H, which are pivoted thereto, and also to the follower C, will raise the same within the press-chamber B, and thereby impart a steady and powerful pressure to the hay confined within said chamber between the follower and upper platen. The ends of levers G G are each provided with a pulley, I, journaled in suitable bearings, said pulley being connected by a rope or chain, J, with a drum, O, that is journaled centrally in the top of the press, and is operated by any suitable power to wind up the rope or chain and force the levers G G inward and the follower C upward.

The inner opposite surfaces of the press box or chamber B are preferably grooved, as shown in Fig. 4, for the purpose of guiding the partition D in its movements. This partition D is used for the purpose of dividing the chamber into two separate compartments, in order that two bales of hay may be made at the same time. Since these compartments must be kept permanently divided during an operation of the press, it is necessary that the partition be carried upward with the follower-platen, and therefore I find it most convenient to construct said partition in several sections, as $a\,b\,c$, Fig. 3, so that as said partition emerges from the slotted upper platen the sections may be severally removed, and thus prevent the partition from coming into contact with the drum, which would happen if it were not made sectional.

The operation of my improved press, therefore, will be as follows: The platen C will first be placed at its lowest limit within the press-box, and the sections of the partitions be placed one above the other, their ends resting within the guide-grooves. The chamber will now be divided into compartments, each of which is to be filled with the quantity of hay which it is desired to compact into a single bale. The leverage will next be actuated to force the follower upward. As each section of the central partition emerges from the chamber and comes clear of the slot it will fall to one side and can be easily removed. When the compression is complete, the lower section only of the partition will be found left in place, all the rest having been removed. By slightly lowering the platen the completed bales can be taken out of the press.

Having thus described my invention, what I claim as new, and desire to secure by Letters Patent, is—

1. The combination of the reciprocating follower, the press-box having its inner opposite sides grooved, the vertical sectional partition sliding in said grooves, and whose sections are severally removable during the ascent of the follower, and the slotted upper platen, all arranged to operate substantially as shown and described.

2. The combination, with the actuating mechanism consisting of levers G G, levers H H, rope J, and drum K, of the rigid slotted platen E, the press-box B, the reciprocating platen, to which levers H H are secured, and the vertical sectional partition D, whose sections protrude through the slot in the platen E during the ascent of the follower, so as to be severally removable, substantially as shown, and for the purposes set forth.

3. In a hay or other press, the chamber B and two-part platen E, in combination with the follower C and sectional partition D, whose sections are severally removable from the press during the ascent of the follower, substantially as shown and described.

4. In a hay-press, the combination of the rigid platen E, having parts $e\ e$ and an intervening slot, the press-box B, the follower C, and the partition D, having sections $a\ b\ c$, substantially as shown and described.

In testimony whereof I affix my signature in presence of two witnesses.

BURWELL J. CURRY.

Witnesses:
LAWRENCE COOPER,
S. W. DAY.